United States Patent
Kozaki

(10) Patent No.: US 12,199,431 B2
(45) Date of Patent: Jan. 14, 2025

(54) MAGNETIC FIELD CONTROL DEVICE AND MAGNETIC FIELD CONTROL METHOD OF SYNCHRONOUS MACHINE

(71) Applicant: MITSUBISHI GENERATOR CO., LTD., Kobe (JP)

(72) Inventor: Tatsuro Kozaki, Yokohama (JP)

(73) Assignee: Mitsubishi Generator Co., Ltd., Kobe (JP)

(*) Notice: Subject to any disclaimer, the term of this patent is extended or adjusted under 35 U.S.C. 154(b) by 532 days.

(21) Appl. No.: 17/475,572

(22) Filed: Sep. 15, 2021

(65) Prior Publication Data
US 2022/0085608 A1    Mar. 17, 2022

(30) Foreign Application Priority Data
Sep. 16, 2020   (JP) .................. 2020-155334

(51) Int. Cl.
*H02J 3/16* (2006.01)
*H02J 3/00* (2006.01)
*H02J 3/18* (2006.01)

(52) U.S. Cl.
CPC .............. *H02J 3/185* (2013.01); *H02J 3/004* (2020.01); *H02J 3/16* (2013.01)

(58) Field of Classification Search
CPC ............... H02J 3/185; H02J 3/004; H02J 3/16
(Continued)

(56) References Cited

U.S. PATENT DOCUMENTS

| | | | | |
|---|---|---|---|---|
| 5,440,222 A | * | 8/1995 | Tanaka | H02P 9/30 322/29 |
| 6,107,784 A | * | 8/2000 | Nomiya | H02J 3/40 323/205 |

(Continued)

FOREIGN PATENT DOCUMENTS

| | | |
|---|---|---|
| CN | 1298191 A | 6/2001 |
| JP | 3-56100 A | 3/1991 |

(Continued)

OTHER PUBLICATIONS

Japanese-language Office Action issued in Japanese Application No. 2020-155334 dated Jan. 10, 2023 with English translation (five (5) pages).

(Continued)

*Primary Examiner* — Jigneshkumar C Patel
(74) *Attorney, Agent, or Firm* — Buchanan Ingersoll & Rooney PC

(57) ABSTRACT

The present invention provides a magnetic field control device and a magnetic field control method for a synchronous machine, which can fundamentally cope with the problem of the lack and fluctuation in the voltage maintaining ability from a point of view of a power generation of a power system. A magnetic field control device of the present invention is a device for a synchronous machine that controls a magnetic field of the synchronous machine connected to a power system. The magnetic field control device comprises a magnetic field control system operating electric current flowing through a magnetic field coil of the synchronous machine; a regulator of the magnetic field control system; and a compensation circuit variably regulating a control constant of the magnetic field control system according to a magnitude of magnetic field current or an equivalent of the magnetic field current.

10 Claims, 14 Drawing Sheets

(58) Field of Classification Search
USPC .......................................................... 700/297
See application file for complete search history.

(56) References Cited

U.S. PATENT DOCUMENTS

| | | | | |
|---|---|---|---|---|
| 6,501,628 B1* | 12/2002 | Namba | ................. | H02H 3/021 |
| | | | | 307/43 |
| 2018/0152020 A1 | 5/2018 | Kuroda et al. | | |

FOREIGN PATENT DOCUMENTS

| | | | |
|---|---|---|---|
| JP | 2008-182789 A | | 8/2008 |
| JP | 2016-208654 A | | 12/2016 |
| JP | 2017103967 A | * | 6/2017 |

OTHER PUBLICATIONS

Office Action dated Aug. 13, 2024, issued in the corresponding Chinese Patent Application No. 202111087586.6, 15 pages including 7 pages of English Translation.

* cited by examiner

FIG. 6

| NO | NAME | CONTROL AMOUNT | OPERATION AMOUNT | PURPOSE | CLASSIFICATION OF STABILITY | DESCRIPTION |
|---|---|---|---|---|---|---|
| 1 | AVR: Automatic Voltage Regulator | POWER GENERATOR TERMINAL VOLTAGE | POWER GENERATOR EXCITATION CURRENT | MAINTAINING OF TERMINAL VOLTAGE OF POWER GENERATOR | POWER STABILITY (TRANSIENT) | DEVICE THAT AUTOMATICALLY CONTROLS EXCITATION CURRENT SO THAT POWER GENERATOR TERMINAL VOLTAGE HAS REFERENCE VALUE |
| 2 | PSVR: Power System Voltage Regulator | MAIN TRANSFORMER SECONDARY VOLTAGE | AVR SET VOLTAGE | MAINTAINING OF SYSTEM VOLTAGE | VOLTAGE STABILITY | DEVICE THAT AUTOMATICALLY PERFORMS CONTROL SO THAT POWER TRANSMISSION LINE SENDING BUS VOLTAGE HAS REFERENCE VALUE BY DIRECTLY ADDING COMPENSATION SIGNAL OF POWER TRANSMISSION LINE SENDING BUS VOLTAGE TO AVR |
| 3 | AQR: Automatic Reactive Power Regulator | MAIN TRANSFORMER PRIMARY SIDE REACTIVE POWER | AVR SET VOLTAGE | MAINTAINING OF SYSTEM VOLTAGE | VOLTAGE STABILITY | DEVICE THAT AUTOMATICALLY CONTROLS EXCITATION CURRENT SO THAT REACTIVE POWER OUTPUT OF POWER GENERATION HAS REFERENCE VALUE |
| 4 | APFR: Automatic Power Factor Regulator | MAIN TRANSFORMER PRIMARY SIDE POWER FACTOR | AVR SET VOLTAGE | MAINTAINING OF SYSTEM VOLTAGE | VOLTAGE STABILITY | DEVICE THAT AUTOMATICALLY CONTROLS EXCITATION CURRENT SO THAT POWER GENERATOR POWER FACTOR HAS REFERENCE VALUE |
| 5 | PSS: Power System Stabilizer | POWER OF POWER GENERATION, FREQUENCY | AVR SET VOLTAGE | IMPROVING OF STABILITY | VOLTAGE STABILITY | EXCITATION CURRENT IS RAPIDLY INCREASED IN IMMEDIATE RESPONSE TO POWER GENERATOR TERMINAL VOLTAGE FLUCTUATION IN ACCIDENT, SO THAT POWER GENERATOR INTERNAL INDUCTIVE VOLTAGE IS INCREASED TO INCREASE SYNCHRONIZATION POWER, THEREBY IMPROVING STABILITY |

MAGNETIC FIELD CONTROL DEVICE AND MAGNETIC FIELD CONTROL METHOD OF SYNCHRONOUS MACHINE

CLAIM OF PRIORITY

The present application claims priority from Japanese Patent Application JP 2020-155334 filed on Sep. 16, 2020, the content of which is hereby incorporated by reference into this application.

BACKGROUND OF THE INVENTION

The present invention relates to a magnetic field control device and a magnetic field control method for a synchronous machine. More specifically, the present invention relates to a magnetic field control device and a magnetic field control method for a synchronous machine preferable for performing the voltage regulation of a power system in a situation where renewable energy not including the voltage regulation function of the power system is increased.

The voltage regulation of a power system is mainly maintained by the magnetic field control of a power generator in a power generation plant and the control of phase modification equipment installed in a substation. In this regard, as conventional power generation plants, a thermal power generation plant, a nuclear power generation plant, and a hydraulic power generation plant including the voltage regulation function of the power system (hereinafter, referred to as conventional-type power generation plant) are mainstream, but the rate occupied by renewable energy not including the voltage regulation function of the power system has been increased in recent years. As a result, the power system as a whole tends to lack in the voltage regulation ability.

From this, a power system operation that considers the renewable energy, such as photovoltaic power generation and wind power generation, is proposed, and for example, for the purpose of providing a power system voltage/reactive power monitoring control device by which even when the fluctuation in the output of the renewable energy with the elapse of time due to weather, the changing of the power supply configuration and the system configuration, and the like occur, the balance between the voltage and the reactive power of the power system can be maintained, and the economic efficiency can be further improved, document JP 2016-208654 discloses "a power system voltage/reactive power monitoring control device that gives transmission data to an individual device capable of regulating the voltage and reactive power of a power system, the power system voltage/reactive power monitoring control device using one or more indexes indicating the stability of the power system to calculate one or more target value limitations, obtaining information about a target value from each of the target value limitations, giving the transmission data including the information about the target value to the individual device, and regulating the voltage and the reactive power at the installation spot by the individual device".

Also, for the purpose of providing a reactive power control system by which when reactive power is controlled by using AQR control by the ON/OFF control of a phase advance capacitor (control by an automatic reactive power regulator AQR), the reactive power does not become leading reactive power, and the PF of the reactive power control can be 1.0, document JP 2008-182789 discloses "a reactive power control system that is grid connected to a commercial power supply, includes a distribution power supply, and controls reactive power at a power reception point from the commercial power supply by AQR control using a phase advance capacitor, the reactive power control system including a detection unit detecting first reactive power that is the reactive power at the power reception point before the AQR control, an AQR determining from the value of the first reactive power whether or not the AQR control is required and performing the AQR control, and an AVR performing AVR control correcting the value of the first reactive power to the reactive power having a value capable of being canceled by the AQR control before the AQR control by the AQR".

It is expected that the tendency of the increase in the renewable energy will be further enlarged in the future, and some predict that the rate occupied by the renewable energy will occupy 50% in 2050.

And, this rate not only simply becomes high, but also is greatly fluctuated. For example, during one day, the daytime during which the photovoltaic power generation is performed increases the rate occupied by the renewable energy including the wind power generation, but the nighttime during which the photovoltaic power generation is not performed relatively decreases the rate occupied by the renewable energy in which the wind power generation is main. Also, the fluctuation in rate like this is fluctuated not only during one day, but also depending on a month, a season, or a region.

It is predicted that such the changing of the configuration rate of the power system in the future will cause some obstacles in maintaining the voltage of the power system. For example, when one of some of the conventional-type power generation plants is separated from the power system, the voltage of the power system is lowered, and it is not easy to recover the voltage. This is because in the power system, the voltage maintaining ability is lowered as a whole. And, as a solution for this, it is assumed that the voltage maintaining ability is enhanced (the capacity of the power generation (the number of power generators) in the conventional-type power generation plant and/or the capacity of the phase modification equipment (the number of phase modification equipment) are enhanced), but the equipment addition according to the rate of the harshest situation fluctuated even during one day is not a good idea in terms of cost.

For this, an invention in JP 2016-208654 monitors the entire power system to control the regional individual problem spot, which is not a fundamental solution for the problem of the lack and fluctuation in the voltage maintaining ability of the entire power system. The method disclosed in JP 2008-182789 in which the phase modification equipment is not effective for the problem of the lack and fluctuation in the voltage maintaining ability, and a solution with this method includes the equipment capacity assuming the harshest situation, which cannot be avoided from being expensive.

SUMMARY OF THE INVENTION

From the above, the present invention provides a magnetic field control device and a magnetic field control method for a synchronous machine, which can fundamentally cope with the problem of the lack and fluctuation in the voltage maintaining ability from a point of view of a power generation of a power system.

The present invention provides a magnetic field control device for a synchronous machine that controls a magnetic field of the synchronous machine connected to a power system, the magnetic field control device comprising: a magnetic field control system operating electric current flowing through a magnetic field coil of the synchronous machine; a regulator of the magnetic field control system; and a compensation circuit variably regulating a control constant of the magnetic field control system according to a magnitude of magnetic field current or an equivalent of the magnetic field current.

The present invention also provides magnetic field control method for a synchronous machine that controls a magnetic field of the synchronous machine connected to a power system, the magnetic field control method comprising: variably regulating a control constant of a magnetic field control system according to a magnitude of magnetic field current or an equivalent of the magnetic field current, the magnetic field control system operating electric current flowing through a magnetic field coil of the synchronous machine.

Advantageous Effects of Invention

According to the present invention, it is possible to provide a more stable and quick magnetic field control device and a magnetic field control method for a synchronous machine, which can fundamentally cope with the problem of the lack and fluctuation in the voltage maintaining ability from a point of view of a power generation of a power system.

BRIEF DESCRIPTION OF THE DRAWINGS

FIG. 6 is a diagram summarizing examples of magnetic field control systems in a magnetic field control device 5 contributing to the maintaining of the voltage of the power system;

DETAILED DESCRIPTION OF THE PREFERRED EMBODIMENTS

Embodiments of the present invention will be described below.

To solve the above problems, in the present invention, magnetic field control in a rotation type synchronous machine is noted. To regulate the voltage of a power system, there are typically a method in which controlled is phase modification equipment (a shunt coil, a capacitor for power, a stationary type reactive power compensation device, and a synchronous phase modifier) in a substation and a method in which a synchronous power generator in a power generation plant is controlled, and the present invention is applied to the magnetic field control in the synchronous machine including both (the synchronous phase modifier and the synchronous power generator). The embodiments will be described by taking the synchronous power generator (hereinafter, simply referred to as a power generator) as an example. Hereinafter, the findings by which the present inventors have noted the magnetic field control in the rotation type power generator in a conventional-type power generation plant will be described.

Figure 1:
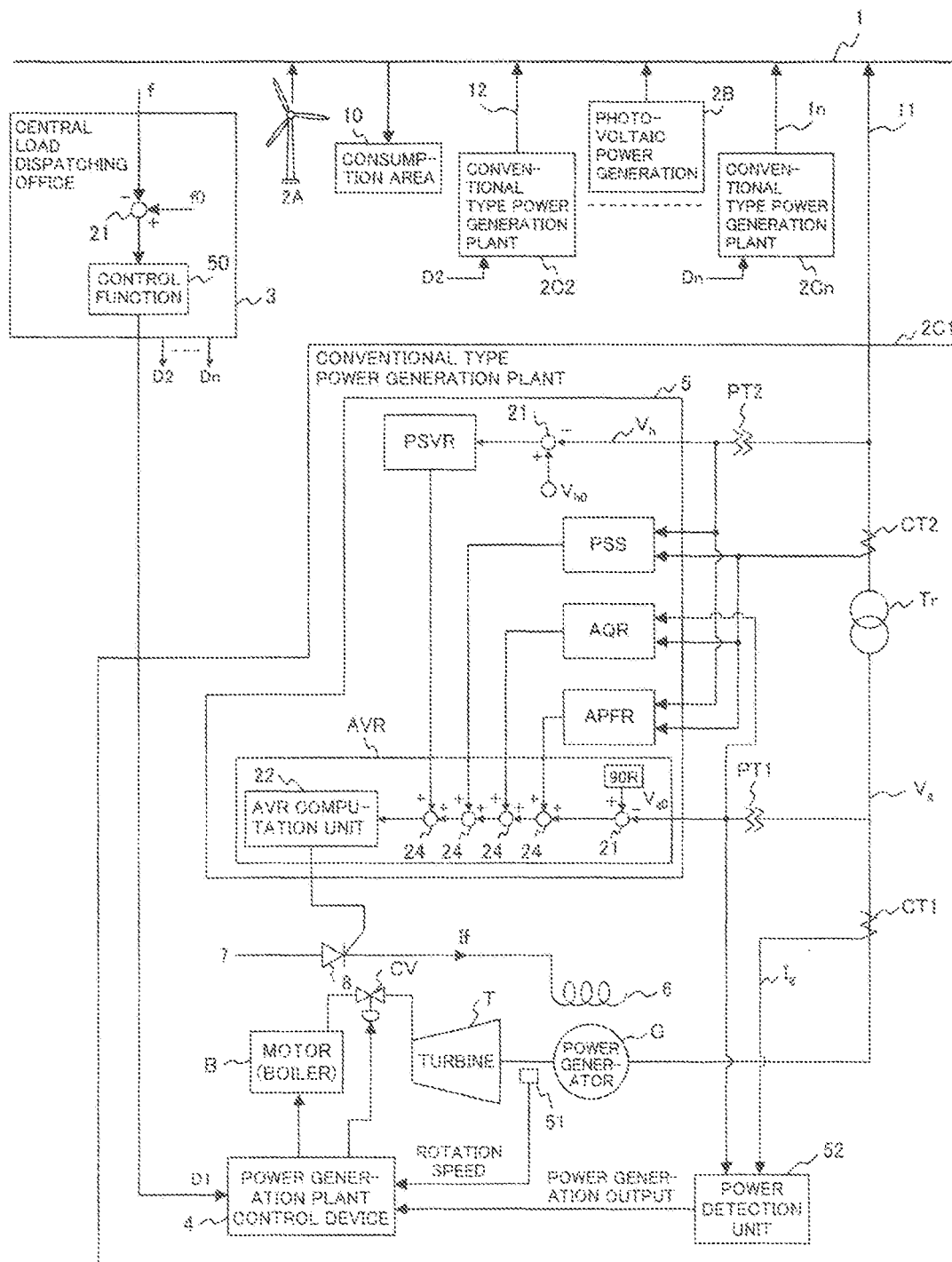
FIG. 1 is a diagram illustrating an example of the configuration of a typical power system and system stabilization control systems.

First, FIG. 1 illustrates an example of the configuration of a typical power system and control systems. In FIG. 1, many power generation plants are grid connected to a power system 1. The power generation plants are plants to provide renewable energy not including a voltage regulation function, such as a wind power generation plant 2A and a photovoltaic power generation plant 2B, and also are conventional-type power generation plants 2C (2C1, 2C2, . . . 2Cn) having the voltage regulation function, such as a thermal power generation plant, a hydraulic power generation plant, and a nuclear power generation plant. To perform power generation according to a load 10 of the entire power system, a central load dispatching office 3 controlling the entire power system includes a control function 50 inputting the difference between a power system frequency f and a constant frequency f0 detected by a subtractor 21 to create output instruction values D (D1, D2, . . . Dn), and instructs them to the conventional-type power generation plants 2C.

A control device 4 in each of the conventional-type power generation plants 2C controls, by a steam regulation valve CV, a steam input from a steam generator B with respect to a turbine T and a power generator G that are mechanically connected. Also, the control device 4 uses each of the output instruction values D as a target value to control the rotation speed obtained by a rotation speed detector 51 or the power generation output calculated by a power detector 52 as feedback values. The power detector 52 calculates the power generation output from a terminal voltage Vg of the power generator G obtained by a voltage transformer PT1 and a terminal current Ig of the power generator G obtained by a current transformer CT1. The electric output from the power generator G is fed to the power system 1 through a transformer Tr and each of power transmission lines 11, 12, . . . 1n. Note that the targets controlled by the control device 4 have been described as the boiler and the steam turbine, but may be a GTCC and the like.

Also, in a magnetic field control device 5 in each of the conventional-type power generation plants 2C, the secondary winding of the synchronous power generator G is a magnetic field coil 6, an AC power supply 7 is made to have direct current by a thyristor 8, and a DC magnetic field current if given to the magnetic field coil 6 is controlled by an automatic voltage regulator AVR that is the main control function of the magnetic field control device 5, so that the generator terminal voltage Vg is regulated to a set voltage Vg0.

In the magnetic field control device 5, the automatic voltage regulator AVR is the main control function, but configured is a series control system that substantially corrects the target value of the automatic voltage regulator AVR by the instruction of an upper control system. In the embodiment of FIG. 1, the upper control system is a control system, such as a power system voltage regulator PSVR, a power system stabilizer PSS, an automatic reactive power regulator AQR, and an automatic power factor regulator APFR, and the instruction of each of these substantially corrects the target value of the automatic voltage regulator AVR that is a lower control system. Examples of correction methods include a method in which a voltage-target setting device 90R of the automatic voltage regulator AVR is directly moved to correct the target value and a method in which addition and subtraction is performed with respect to the voltage deviation. In FIG. 1, a method in which addition and subtraction is performed with respect to the voltage deviation by each adder 24 is illustrated as a correction method. The correction method may be achieved by the method in which the target value is changed. The automatic voltage regulator AVR detects the terminal voltage Vg of the power generator G that is the synchronous machine by the voltage transformer PT1, calculates the difference between the terminal voltage Vg and the set voltage Vg0 set by the voltage-target setting device 90R by the subtractor 21, regulates the thyristor 8 through a regulator (AVR arithmetic operation section) 22 having a proportional computation function, and regulates the magnetic field current If given to the magnetic field coil 6. Other control systems will be described later in detail with reference to the drawings. As signal inputs to other control systems, there are the terminal voltage Vg of the power generator G from the voltage transformer PT1, a bus voltage Vh from a voltage transformer PT2, and the terminal current Ig of the power generator G from a current transformer CT2.

Figure 2:
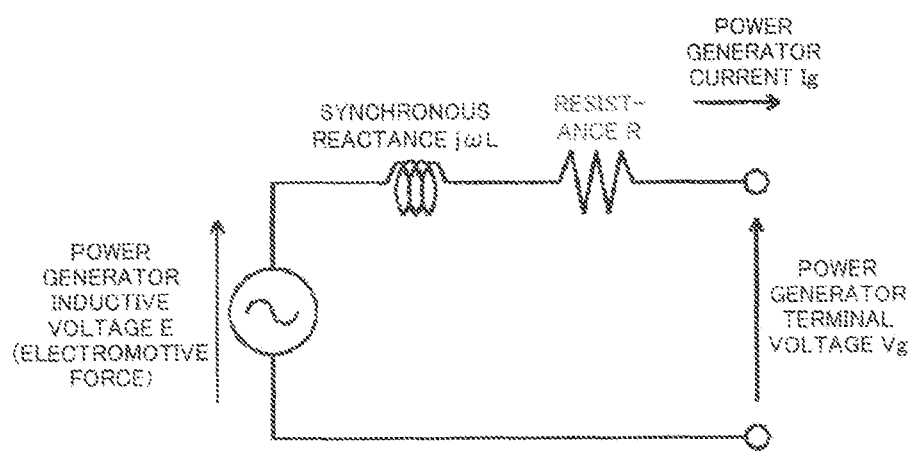
FIG. 2 is a diagram illustrating the equivalent circuit of a power generator G in which the terminal is open.

FIG. 2 illustrates the equivalent circuit of the power generator G in which the terminal is open. From this, the power generator G can be represented by a series circuit including internal inductive power E in the interior of the power generator (also called an electromotive voltage), a synchronous reactance $Xs=j\omega Ls$, and a resistance R, and the externally measurable values are the power generator current Ig and the generator terminal voltage Vg. Thus, the internal inductive power E is calculated as the estimation value from the synchronous reactance $Xs=j\omega Ls$, the resistance R, the power generator current Ig, generator terminal voltage Vg. Note that $\omega=2\pi f$ where f is frequency.

Figure 3:
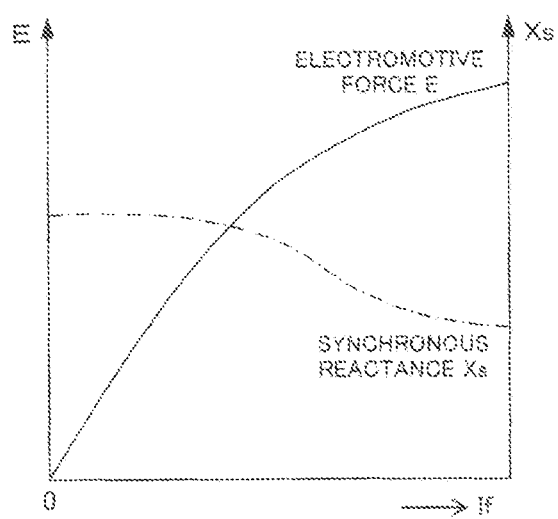
FIG. 3 is a diagram illustrating the relationship between magnetic field current If, an electromotive force E, and a synchronous reactance Xs.

FIG. 3 is a diagram illustrating the relationship between the magnetic field current If on the horizontal axis and the electromotive force E and the synchronous reactance Xs on the vertical axis, and in short, the electromotive force E represents a saturation characteristic with respect to the increase in the magnetic field current If, and the synchronous reactance Xs represents lowering tendency.

Figure 4:
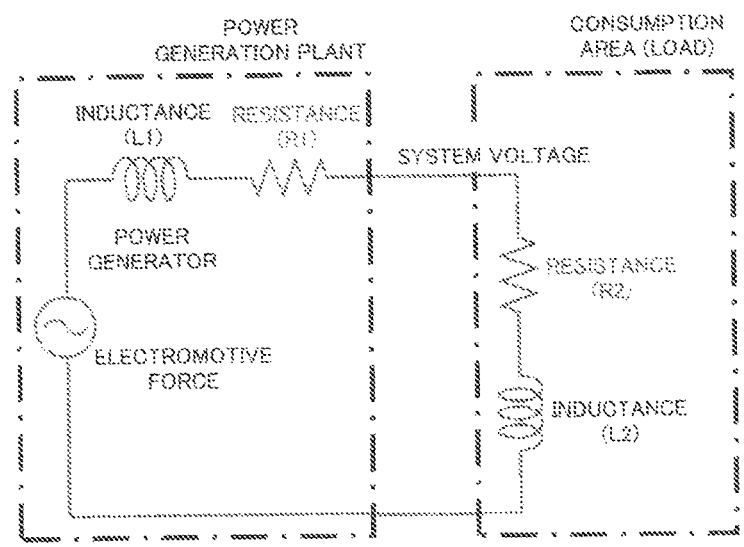
FIG. 4 is a diagram illustrating an equivalent circuit from the power generator to a load that is a consumption area.

FIG. 4 illustrates an equivalent circuit from the power generator to the load that is a consumption area, in which in the power generator, the inductance is L1 and the resistance is R1, and on the load side, the inductance is L2 and the resistance is R2. From the equivalent circuit of FIG. 4, a time constant (T) representing the following speed of a system voltage V with respect to the electromotive force E of the power generator can be calculated as expressed by the equation (1):

$$\tau[\sec]=(L1+L2)/(R1+R2). \quad (1)$$

Figure 5:
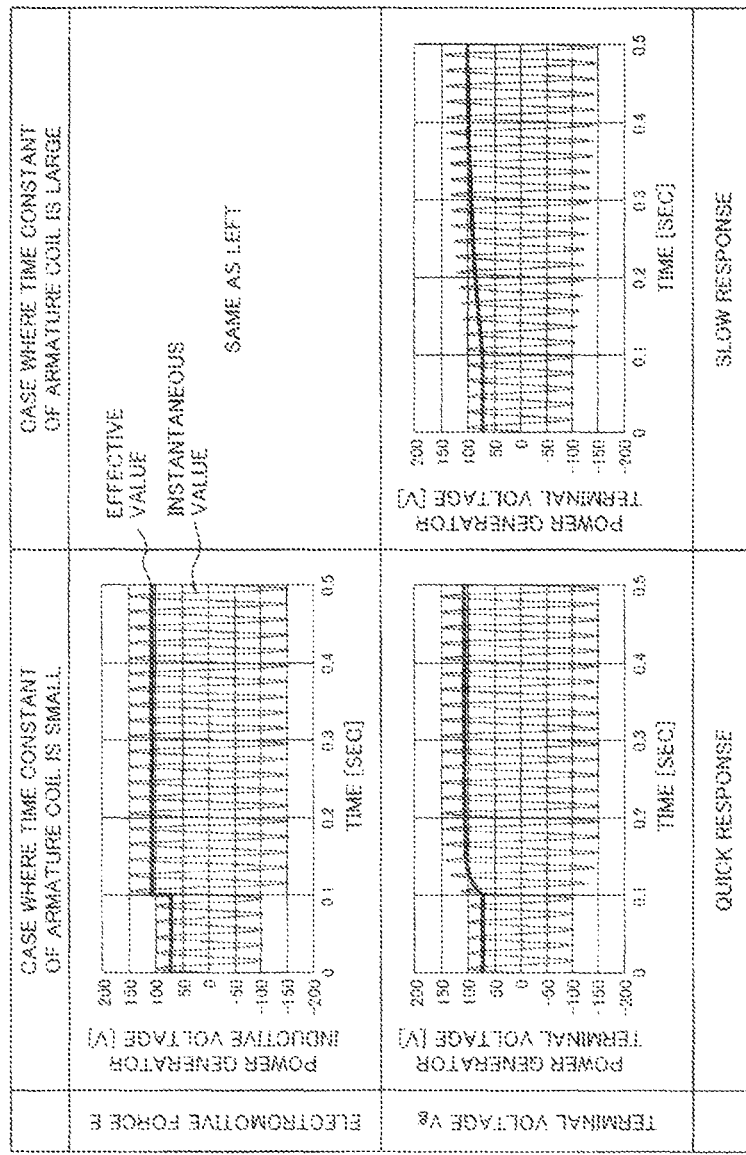
FIG. 5 is a diagram illustrating the response characteristics of a time constant T, the electromotive force E, and a terminal voltage V.

FIG. 5 illustrates the response characteristics of the electromotive force E and the terminal voltage Vg in a case where the time constant $\tau$ is large and in a case where the time constant $\tau$ is small. Here, as illustrated in the upper left, illustrated are the instantaneous value and the effective value when the electromotive force E is increased from 75% to 100% at time of 0.1, and this condition is the same for the case where the time constant $\tau$ is large in the upper right. Note that to discriminate the instantaneous value and the effective value, the effective value is represented by a thick line, and the instantaneous value is represented by a thin line. For this change, in the terminal voltage Vg, in the case where the time constant $\tau$ is small, the response of the system voltage V with respect to the electromotive force E of the power generator becomes quick, as illustrated in the lower left (the final value is reached immediately). On the other hand, in the case where the time constant is large, the response becomes slow, as illustrated in the lower right, and the final value is not reached immediately. That is, the response speed of the system voltage V with respect to the electromotive force E of the power generator is not constant, and is changed according to the magnetic field current If.

Here, the control gain (such as Ka) of the voltage maintaining function is a fixed value. Note that in the design of the actual control devices, those proportional gains are decided by assuming the representative control state (the time constant of the circuit).

From the above, when the rate of the renewable energy is increased from now on, the magnetic field current of the power generator, the synchronous reactance, and the response time constant of the power generator are greatly changed to maintain the voltage of the power system, and are greatly different from those assumed in the control design, so that the control cannot be done appropriately.

On the basis of the above findings, in the present invention, the control constant of the magnetic field control system associated with the voltage maintaining is changed according to the magnitude of the magnetic field current of the power generator. Further, the control constant of the magnetic field control system is changed according to the equivalent of the magnetic field current of the power generator. Here, the equivalent of the magnetic field current is, for example, a power generator power factor, and is power generator reactive power.

Also, here, the control constants are the proportional gain Ka in proportional control and an integral gain Ki and an integration time constant Ti in integral control. Note that in the description of the subsequent embodiment, a case where the proportional gain Ka is changed will be mainly described, and a case where the integral gain Ki is changed by including the integration time constant Ti (integral gain Ki=1/integration time constant Ti) will be described in embodiment 7 of FIG. 14.

Returning to FIG. 1, in the present invention, the magnetic field control device 5 in the rotation type power generator of the conventional-type power generation plant illustrated in this drawing is noted. The magnetic field control device 5 is a collection of a plurality of control systems in which the automatic voltage regulator AVR is the main control system, and FIG. 1 illustrates an example where the magnetic field control device 5 is configured by including the control systems, such as the power system voltage regulator PSVR, the power system stabilizer PSS, the automatic reactive power regulator AQR, and the automatic power factor regulator APFR. Note that the input and the processing contents of each of the control systems will be individually described in detail, but its output finally controls the magnetic field current of the power generator through the control system of the automatic voltage regulator AVR.

FIG. 6 is a diagram summarizing examples of the magnetic field control systems in the magnetic field control device 5 contributing to the maintaining of the voltage of the power system. Here, the magnetic field control systems are summarized in view of the control amount, the operation amount, the control purpose, and the like. From this drawing, the control amount of each of these is varied according to the control purpose, whereas the operation amount directly controls the power generator magnetic field current, or indirectly controls the power generator magnetic field current through the automatic voltage regulator AVR.

Embodiment 1

The present invention changes the control constants (the proportional gain Kα in the proportional control and the integral gain Ki and the integration time constant Ti in the integral control, for instance) of each of the magnetic field control systems according to the magnetic field current or its equivalent of the power generator, and subsequent embodiments 1 to 6 will describe the changing of the proportional gain Ka in the proportional control, and embodiment 7 will summarizedly describe the changing of the integral gain Ki and the integration time constant Ti in the integral control.

Figure 7:
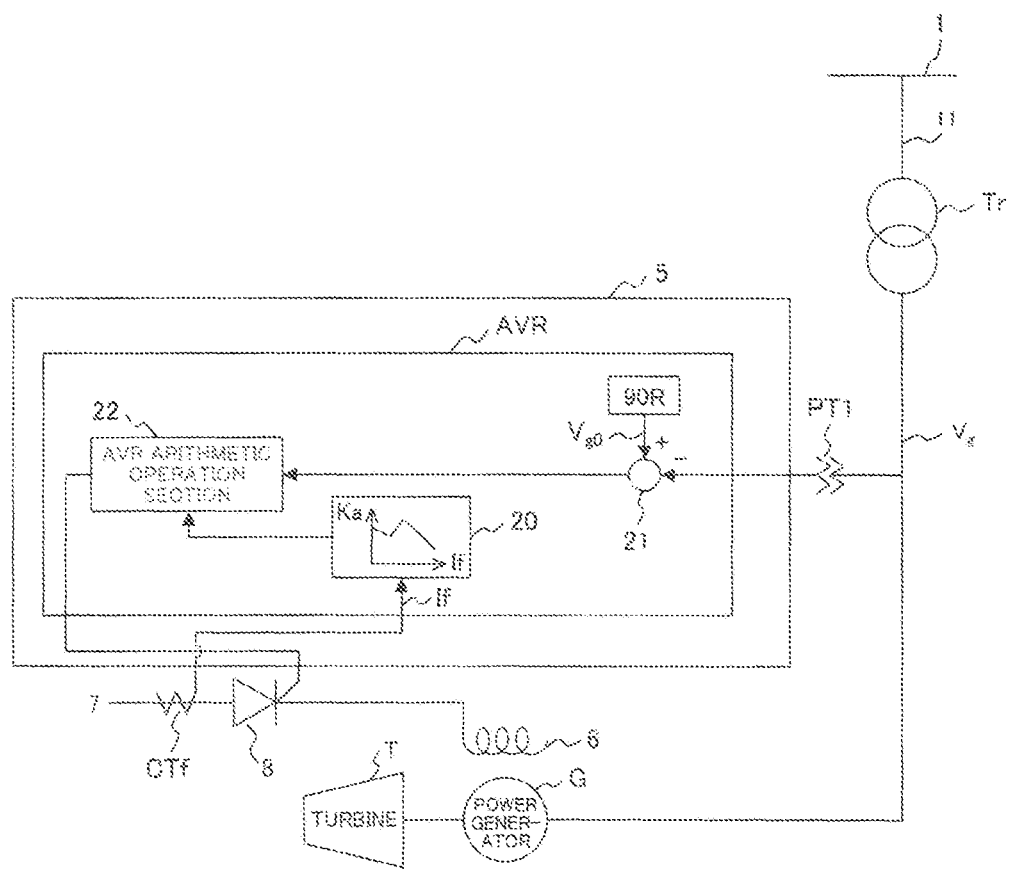
FIG. 7 is a diagram illustrating an example of the configuration of the magnetic field control device of the power generator according to embodiment 1 of the present invention.

Embodiment 1 is a case associated with the automatic voltage regulator AVR as the specific regulation target. FIG. 7 illustrates an example of the configuration of the magnetic field control device of the power generator according to embodiment 1 of the present invention. The automatic voltage regulator AVR of FIG. 7 detects the terminal voltage Vg of the power generator G that is the synchronous machine by the voltage transformer PT1, calculates the difference between the terminal voltage Vg and the set voltage Vg0 set by the voltage-target setting device 90R by the subtractor 21, regulates the thyristor 8 through the regulator (AVR arithmetic operation section) 22 having the proportional computation function, and regulates the magnetic field current If given to the magnetic field coil 6. Note that the regulator (AVR arithmetic operation section) 22 may include a leading/lagging compensation circuit in the AVR control system.

The automatic voltage regulator AVR is installed in the magnetic field control device 5 for the synchronous machine G, and has purposes, for example, for improving the dynamic stability by maintaining the voltage at the time of the change in the load and regulating the reactive power by the function of holding the voltage of the synchronous machine G constant during the steady operation and for preventing the voltage increase at the time of cutting off the load to improve the transient stability by the function of recovering the voltage immediately at the time of the sudden change in the voltage. For the purposes, the automatic voltage regulator AVR is required to reduce the total voltage fluctuation rate (control deviation), to have sufficient immediate responsiveness, and to be sufficiently stable as the control system (to have the sufficient gain allowance and phase allowance).

In the present invention, the proportional gain Ka of the regulator 22 having the proportional computation function in the automatic voltage regulator AVR is changed according to the magnitude of the magnetic field current if of the power generator. A compensation circuit 20 for this is configured as, for example, a function generator receiving, as an input, the magnetic field current if detected by a current transformer CTf, and variably regulates the proportional gain Ka of the regulator 22. The function at this time is the equation (2):

$$Ka[A/V]=f(If). \quad (2)$$

Note that its characteristic is that when the magnetic field current If becomes large, the proportional gain Ka of the regulator 22 becomes small. The characteristic of the function is previously decided by simulation, or is decided by a test. Further, the function should be decided by learning control. In the learning control, the control device or the control system itself stores the relationship between a control measure and its execution result, and improves the control measure on the basis of the relationship. The learning control is used when the characteristic of the control target and the peripheral environment condition cannot be grasped completely and the appropriate control measure cannot be previously designed. With the learning function, the control device or the control system itself can immediately adapt to a situation experienced in the past or a situation close to the situation experienced in the past, and also has an ability that can gradually adapt to a new situation that has not been experienced. The function determined in this way typically has a polygonal line type.

Note that more typically, the power generator in the present invention is the synchronous machine, and this concept also includes the synchronous phase modifier. Note that the synchronous phase modifier has the synchronous electric motor connected in a no-load state to the power system, acts as a capacitor that takes the leading current from the line when the magnetic field of the synchronous phase modifier is overexcited for operation, and acts as a coil that takes the lagging current from the line when the magnetic field of the synchronous phase modifier is underexcited for operation. When the power system has overload, the load power factor of the line is lowered in the lagging direction, so that by overexciting the synchronous phase modifier, the load power factor is improved to improve the voltage lowering of the line. Also, when the power system has a light load and the charging current of the line is large, the load power factor of the line is lowered in the leading direction, so that for use, by underexciting the synchronous phase modifier, the load power factor is improved to prevent the voltage increase of the line. The synchronous phase modifier includes the automatic voltage regulator AVR to perform the voltage constant control, so that the same compensation control as that described in embodiment 1 of the present invention is applicable as-is.

According to embodiment 1 of the present invention, even when the rate of the renewable energy present in the system is increased, the voltage of the power system is greatly fluctuated, the magnetic field current of the power generator is changed, and the control characteristic of the power generator-automatic voltage regulator AVR system is changed, the gain Ka of the regulator of the automatic voltage regulator AVR is automatically changed to the optimum value, so that the voltage of the power system can be controlled to the original value stably and immediately. That is, the robustness can be improved.

Embodiment 2

Embodiment 2 is a case associated with the power system voltage regulator PSVR as the specific regulation target. A configuration example in which in the magnetic field control device 5 of FIG. 1, the output of the power system voltage regulator PSVR is inputted in the form of being added to the voltage deviation of the automatic voltage regulator AVR is illustrated.

Here, the power system voltage regulator PSVR is a device that controls the magnetic field current If of the power generator according to the deviation between the power transmission line sending bus voltage Vh calculated by the voltage transformer PT2 installed on the transformer Tr secondary side of FIG. 1 and its reference voltage Vh0 and maintains the power transmission line sending bus voltage Vh to the reference value Vh0. Note that the power transmission line sending bus voltage means the bus voltage to the power system. Very simply, it can be said that the automatic voltage regulator AVR constantly controls the generator terminal voltage, whereas the power system voltage regulator PSVR constantly controls the bus voltage.

Figure 8A:
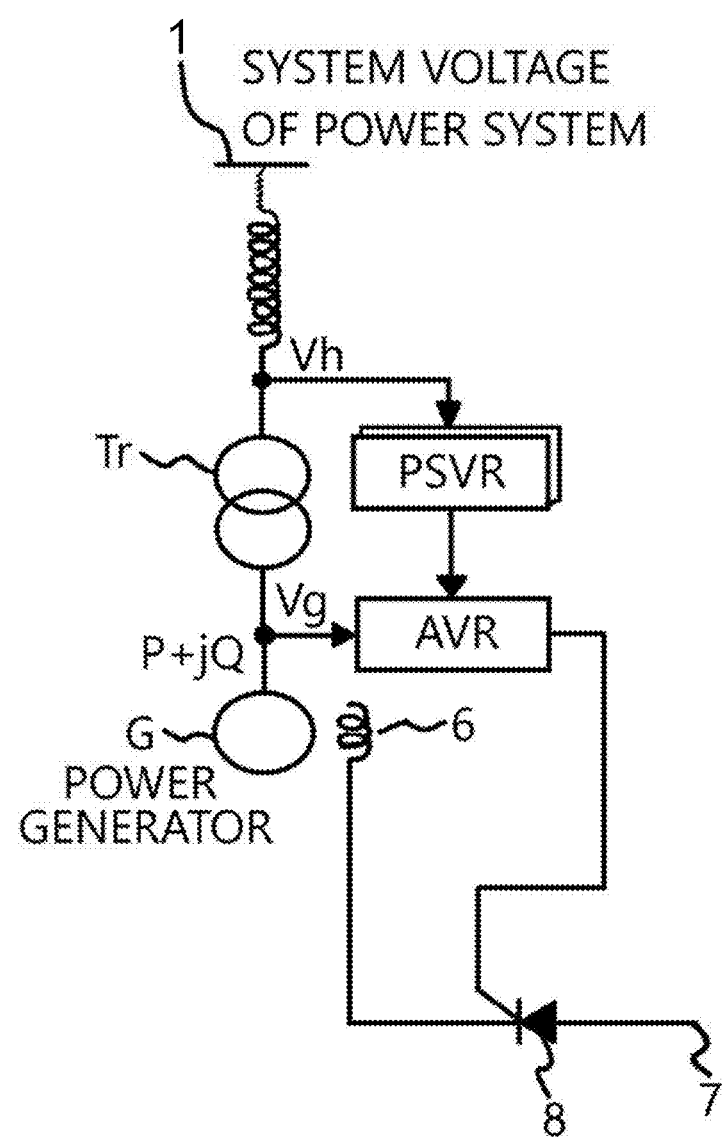
FIG. 8A is a diagram illustrating the entire configuration of a power system voltage regulator PSVR.
Figure 8B:
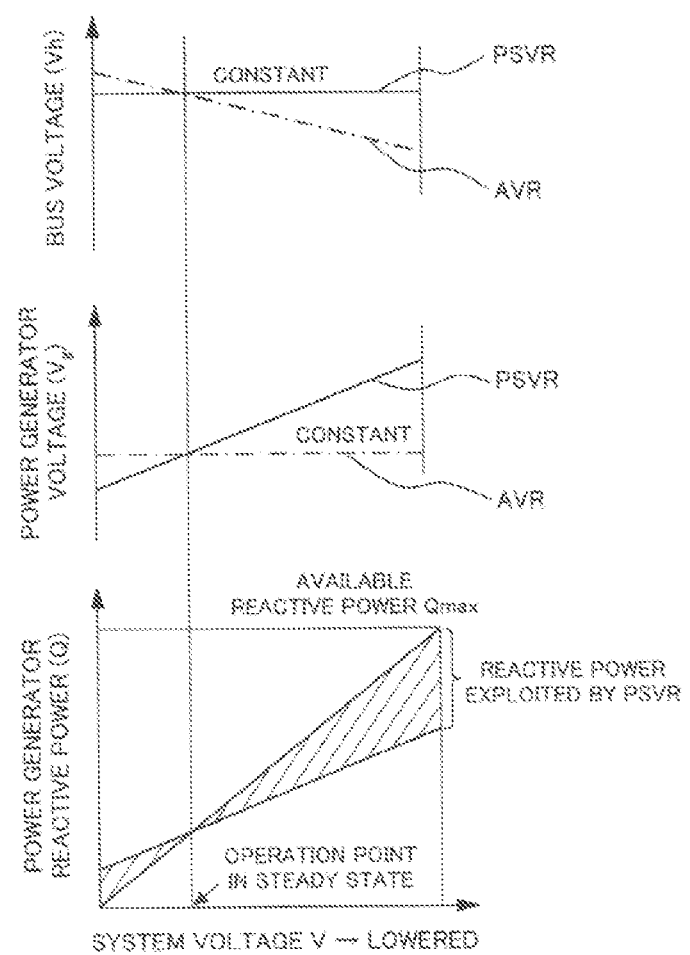
FIG. 8B is a diagram illustrating the relationship between the power transmission voltage, the generator terminal voltage, and the reactive power when the system voltage is lowered at the time of the control by the power system voltage regulator PSVR and an automatic voltage regulator AVR.

The principle of the power system voltage regulator PSVR will be described with reference to FIGS. 8*a* and 8*b*. FIG. 8*a* is a diagram illustrating the relationship between the power generator and the power system as a single machine infinite system model. Also, FIG. 8*b* is a diagram illustrating the relationship between the power transmission voltage (the upper stage in the drawing), the generator terminal voltage (the middle stage in the drawing), and the reactive power (the lower stage in the drawing) at the time of the lowering of the system voltage at the control by the power system voltage regulator PSVR indicated by a solid line and the control by the automatic voltage regulator AVR indicated by an alternate long and short dash line.

From this, in the system voltage operation range in the steady state, both controls are brought into substantially the same operation state, but the power transmission voltage is constantly controlled by the power system voltage regulator PSVR at the time of the lowering of the system voltage, thereby performing the control by which the power generator voltage is automatically increased by the reactance lowering amount of the booster transformer to increase the reactive power.

On the contrary, since the control of the automatic voltage regulator AVR constantly controls the generator terminal voltage, the reactive power is less likely to occur, and the power transmission voltage is lowered in proportional to the lowering of the power transmission voltage. After all, the purpose of the power system voltage regulator PSVR can cause much reactive power in the diagonal line portion to increase the power transmission voltage for holding it constant, reduce the lowering of the system voltage, and improve the voltage stability of the entire system.

Figure 9:
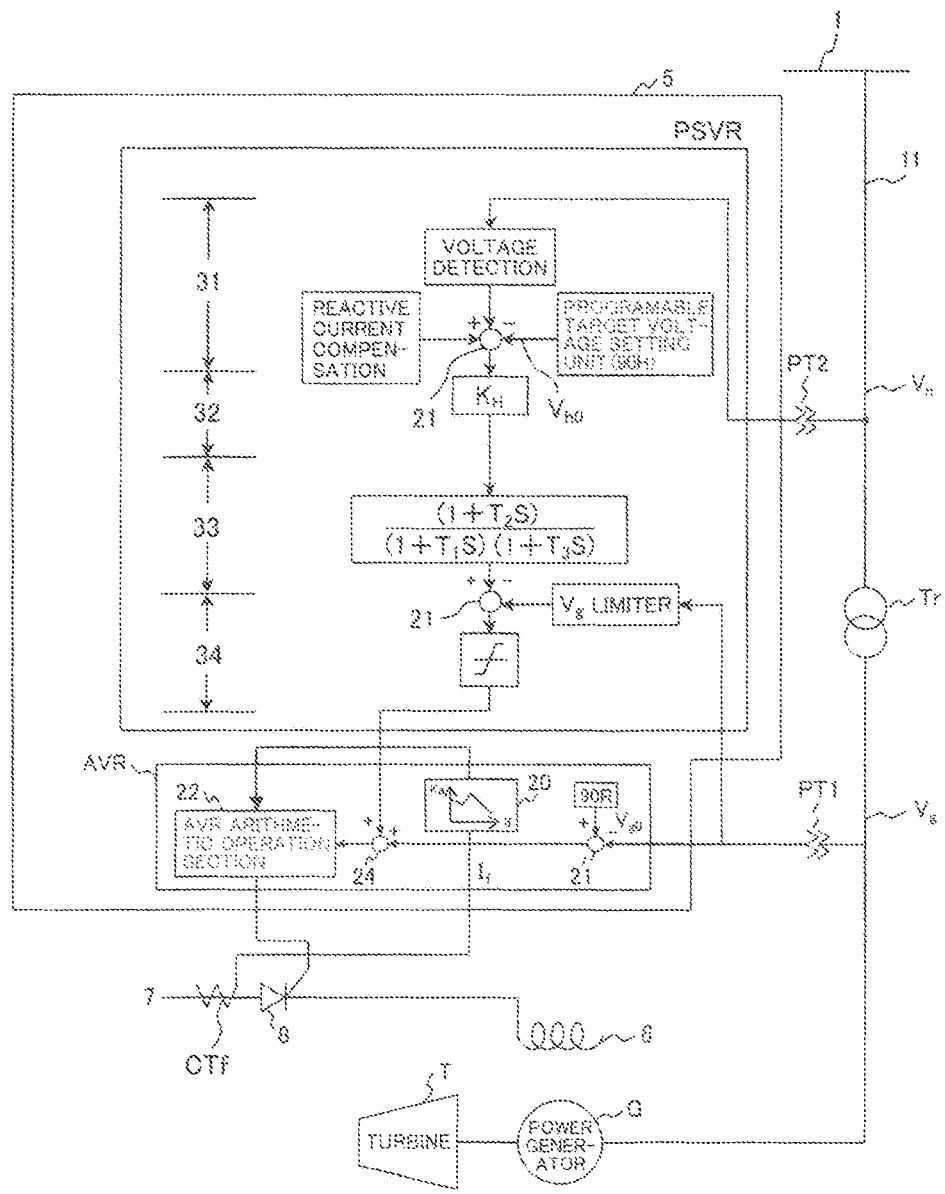
FIG. 9 is a diagram illustrating an example of the configuration of the typical power system voltage regulator PSVR.

FIG. 9 illustrates an example of the configuration of the typical power system voltage regulator PSVR. In this circuit configuration example, the power system voltage regulator PSVR is configured of a voltage detection reference voltage setting unit 31 performing the reactive current correction to the difference between the detection value of the bus voltage Vh and the set voltage Vh0 by a voltage-target setting device 90H by the subtractor 21, a reactive power distribution unit 32 compensating for the voltage lowering amount especially in the portion of the booster transformer Tr by multiplying the calculated difference voltage by a gain KH, a phase compensation circuit unit 33 for leading and lagging, an output limiter 34 limiting the difference between the output of the phase compensation circuit unit 33 and the generator terminal voltage Vg calculated by the subtractor 21, and the like. The output of the power system voltage regulator PSVR is added with a generator terminal voltage deviation signal by the adder 24 in the automatic voltage regulator AVR, is regulated by the regulator 22 in the automatic voltage regulator AVR, and then controls the magnetic field current through the thyristor 8.

From this circuit configuration, the output of the power system voltage regulator PSVR reaches the magnetic field control through the regulator 22 in the automatic voltage regulator AVR. In the present invention, depending on the magnitude of the magnetic field current of the power generator, the control gain of the magnetic field control system is changed according to the magnitude of the magnetic field current of the power generator, but for achieving this, the proportional gain Ka of the regulator of any one of a series of magnetic field control systems from the power system voltage regulator PSVR to the magnetic field control through the regulator 22 in the automatic voltage regulator AVR should be variably set by the compensation circuit 20 of FIG. 7. That is, the proportional gain Ka of the regulator in the loop transfer function related to the power transmission voltage control magnetic field system should be variably set. In FIG. 9, the proportional gain Ka of the regulator 22 in the automatic voltage regulator AVR is variably set.

Specifically, the portion in the control system that can variably change the control gain includes one method in which the gain of the regulator 22 in the automatic voltage regulator AVR is changed as in FIG. 7, and the other method in which the control gain of the regulator in the power system voltage regulator PSVR is variably regulated. The present invention may use any one of the methods, which is the same for cases of other control systems described below.

However, a case where the gain of the regulator 22 in the automatic voltage regulator AVR is changed and a case where the control gain of the regulator in the individual control system is changed are different in the characteristic that should be included in the compensation circuit 20, so that needless to say, the preferable function should be set as needed. Also, the control gain of the individual control system is left as it is, and even in any control case, when the gain of the regulator 22 in the automatic voltage regulator AVR is commonly changed, the control gain is not always optimized depending on the control system, so that it can be considered that the effect equalized to some degree should be allowed to be exhibited.

Note that how the voltage of the power system is controlled by using the power system voltage regulator PSVR is as follows. First, the bus voltage Vh is detected to be taken into the power system voltage regulator PSVR, this processing result is reflected to the set voltage of the automatic voltage regulator AVR to determine the electromagnetic current by the automatic voltage regulator AVR, and the terminal voltage of the power generator is changed, and is reflected to the voltage Vh of the power system through the transformer power transmission line.

In this control, when the voltage of the power system is lowered, the power system voltage regulator PSVR acts to increase the set voltage of the automatic voltage regulator AVR, and this increases the magnetic field current, as illustrated in FIG. 3, and at the same time, the synchronous inductance is changed according to the magnetic field current, so that the response characteristic of the power generator is changed from the optimum state to the non-optimum state. In this respect, in the present invention, the control gain is variable according to the magnitude of the magnetic field current, so that the responsiveness is improved.

Embodiment 3

Embodiment 3 is a case associated with the automatic reactive power regulator AQR as the specific regulation target. The automatic reactive power regulator AQR is a device that automatically controls the magnetic field current so that the reactive power output of the power generator has the reference value given by the function of the active power output. For the purpose of reducing the power transmission loss and of making the reactive power flow appropriate, this method can be adopted by a thermal power generation plant or a pumped storage power generation plant that is close to the demand end and has a high reactive power regulation effect.

Figure 10:
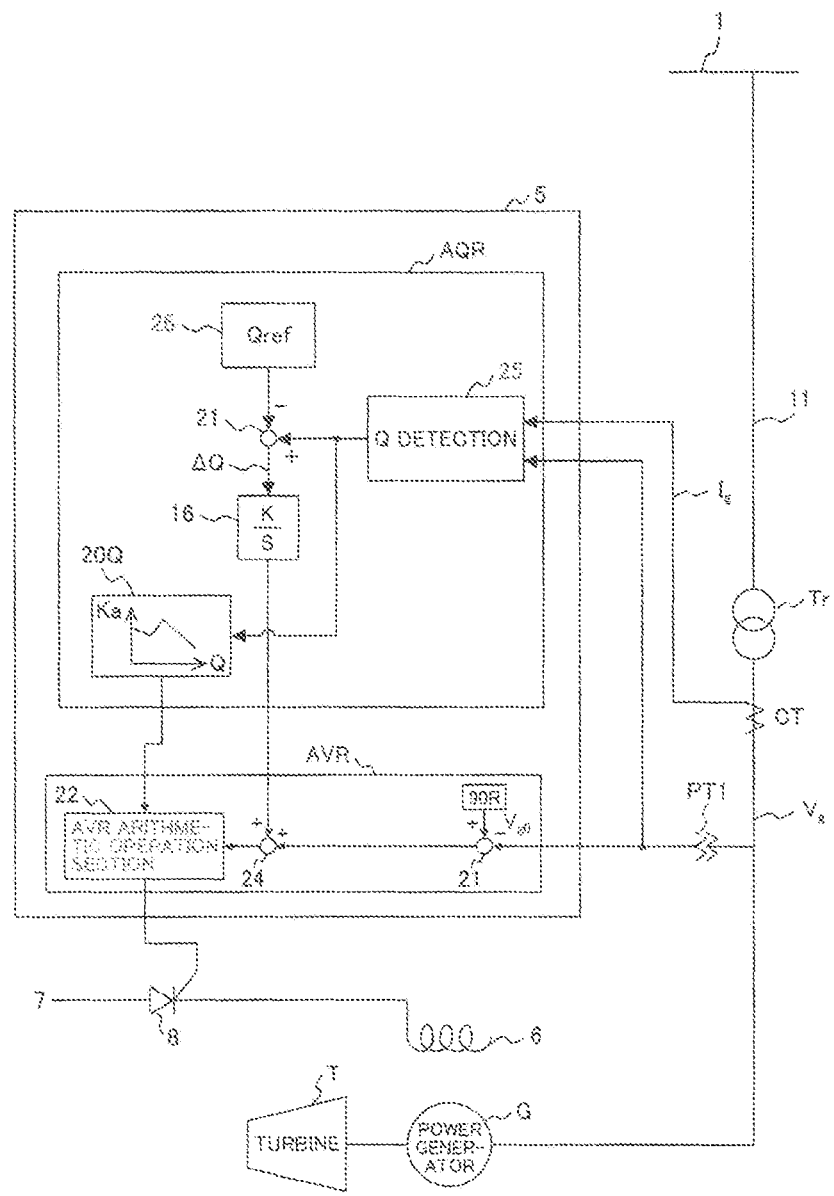
FIG. 10 is a diagram illustrating an example of the specific configuration of an automatic reactive power regulator AQR.

A configuration example in which the automatic reactive power regulator AQR is included in the magnetic field control device 5 of FIG. 1 is illustrated. Further, FIG. 10 illustrates an example of the specific configuration of the automatic reactive power regulator AQR. From FIG. 10, the reactive power is calculated from the generator terminal voltage Vg and the load current Ig by a reactive power detection unit 25, a difference ΔQ between the reactive power and the set reactive power given by a reactive power setting unit 26 is calculated by the subtractor 21, this is integrated by, for example, an integration circuit 16 to be the set voltage, and this is reflected to the set voltage of the automatic voltage regulator AVR.

The variable regulation of the proportional gain Ka in the case of embodiment 3 can be changed according to the magnitude of the magnetic field current as in embodiments 1 and 2, but when the automatic reactive power regulator AQR is configured, the reactive power can be used instead of the magnetic field current. That is, the reactive power is an element that can be replaced with the magnetic field current, and can be positioned as the equivalent of the magnetic field current.

Why the reactive power can be adopted as the equivalent of the magnetic field current is as follows. First, reactive power Q can be calculated by the equation (3) from active power P and a power factor PF:

$$Q = P \cdot \sqrt{(1-PF^2)}/PF. \quad (3)$$

Also, here, the power factor PF can be calculated by the equation (4) from the resistance R and the inductance L of the coil present in the circuit:

$$PF = R/\sqrt{(R^2 + (2\pi f L)^2)} \quad (4)$$

Figure 11:
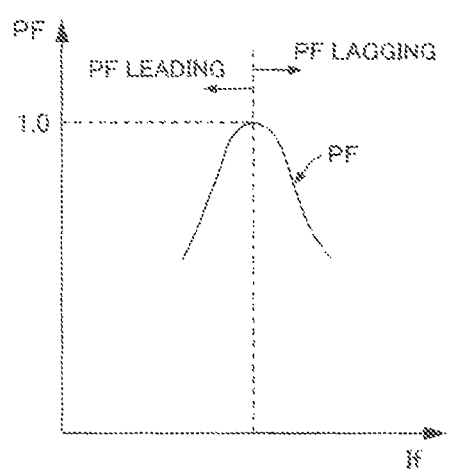
FIG. 11 is a diagram illustrating the relationship between the magnetic field current If and a power factor PF.

On the other hand, a synchronous inductance Ls of the power generator is changed by the magnetic field current If, as illustrated in FIG. 3. FIG. 11 is a diagram illustrating the magnetic field current If on the horizontal axis and the power factor PF on the vertical axis. By having the power factor 1 as a boundary, a symmetric characteristic is illustrated by the leading power factor (PF leading) and the lagging power factor (PF lagging). This means that when the magnetic field current if is changed, the power factor is also changed, so that the power factor can be used instead of the magnetic field current If. Likewise, when the magnetic field current If is changed, the power factor is also changed, and the reactive power Q is also changed, so that the reactive power Q can be used instead of the magnetic field current if. In this way, the power factor PF and the reactive power Q can be positioned as the equivalent of the magnetic field current IF.

The automatic reactive power regulator AQR of FIG. 10 includes a compensation circuit 20Q receiving, as an input, the reactive power Q to give the appropriate control gain, thereby variably regulating the control gain in the magnetic field control system. The compensation circuit 20Q reduces the control gain of the regulator of the magnetic field control system when the magnitude of the reactive power Q that is the equivalent of the magnetic field current is large. Also in this case, at which spot in the magnetic field control system the control gain is variable is a matter that can be adopted as needed. In FIG. 10, the proportional gain Ka of the regulator 22 in the automatic voltage regulator AVR is variably set.

Embodiment 4

Embodiment 4 is a case associated with the automatic power factor regulator APFR as the specific regulation target. The automatic power factor regulator APFR is referred to as a device that automatically regulates the magnetic field current so that the power generator power factor becomes constant. When the reactive power necessary for holding the power generator voltage constant by the power generator having a small capacity, the power generator has overcurrent, so that typically, this device is often installed.

Figure 12:
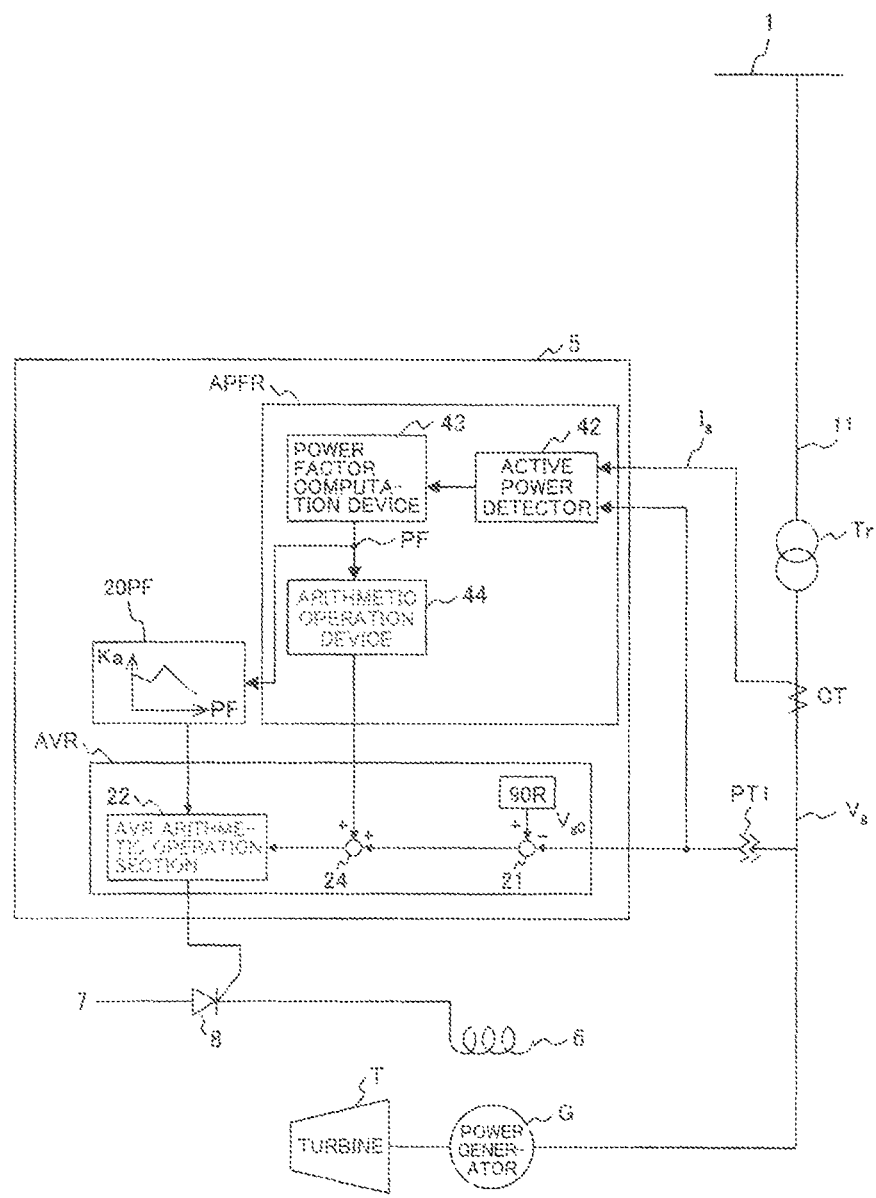
FIG. 12 is a diagram illustrating an example of the specific configuration of an automatic power factor regulator APFR.

A configuration example in which the automatic power factor regulator APFR is included in the magnetic field control device 5 of FIG. 1 is illustrated. Further, FIG. 12 illustrates an example of the specific configuration of the automatic power factor regulator APFR. From FIG. 12, the automatic power factor regulator APFR has a control configuration by which the active power of the power generator G is detected by an active power detector 42 to calculate the power factor PF by a power factor computation device 43, and the processing according to the difference between the target power factor and the measured power factor is performed by a arithmetic operation device 44, thereby reflecting the processing result to the voltage deviation of the automatic voltage regulator AVR. Note that in reflecting the processing result to the voltage deviation, there are a method in which the set voltage of the voltage-target setting device 90R is changed and a method in which the processing result is added to the voltage deviation, and the present invention may use any one of them. This point is the same for other control systems.

As described in embodiment 3, the power factor PF is the equivalent of the magnetic field current If, so that the automatic power factor regulator APFR of FIG. 12 includes a compensation circuit 20PF receiving, as an input, the power factor PF to give the appropriate control gain, thereby variably regulating the control gain in the magnetic field control system. When the magnitude of the power factor PF that is the equivalent of the magnetic field current is large, the compensation circuit 20PF reduces the control gain of the regulator of the magnetic field control system. In FIG. 12, the proportional gain Ka of the regulator 22 in the automatic voltage regulator AVR is variably set. Also in this case, determining at which spot in the magnetic field control system the control gain is variable is a matter that can be adopted as needed.

Embodiment 5

Embodiment 5 is a case associated with the power system stabilizer PSS as the specific regulation target. The power system stabilizer PSS rapidly increases the magnetic field current in immediate response to the generator terminal voltage fluctuation in an accident, so that the power generator internal inductive voltage is increased to increase the synchronization power, thereby enabling the stability to be improved. This can significantly improve the dynamic stability during the leading power factor operation that is particularly a problem for the stability. However, the adoption of the automatic voltage regulator AVR having a high speed and a high gain increases the synchronizing power, but on the other hand, the automatic voltage regulator AVR has a characteristic that weakens the braking force, so that depending on the system configuration and the operation state, secondary fluctuation by the automatic voltage regulator AVR can be caused. As a solution for this, the rotation speed and the output change amount of the power generator are detected, and a stabilization signal is inputted to the automatic voltage regulator AVR, thereby increasing the braking force.

Figure 13:
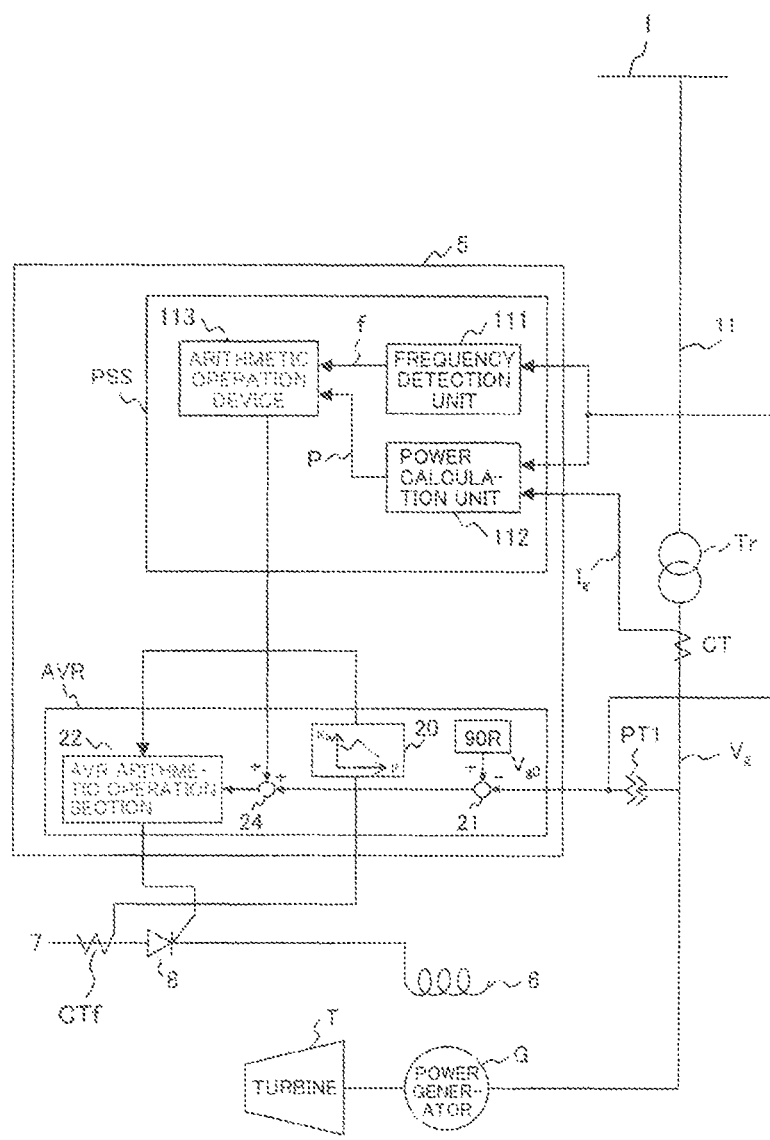
FIG. 13 is a diagram illustrating an example of the specific configuration of a power system stabilizer PSS.

A configuration example in which the power system stabilizer PSS is included in the magnetic field control device 5 of FIG. 1 is illustrated. Further, FIG. 13 illustrates an example of the configuration of the power system stabilizer PSS. From FIG. 13, the system stabilization signal is calculated by a arithmetic operation device (power fluctuation calculation unit) 113 from the power system frequency f detected by a frequency detection unit 111 and the active power P detected by a power calculation unit 112, and by using this, the set voltage of the automatic voltage regulator AVR is corrected.

In this system, by installing the same compensation circuit 20 as embodiment 1, the initial purpose of the present invention can be achieved. In FIG. 13, the proportional gain Ka of the regulator 22 in the automatic voltage regulator AVR is variably set.

Embodiment 6

Embodiment 6 proposes that the control gain regulation described in embodiments 1 to 5 is changed according to each of the operation states of the power generator system side.

Here, each of the operation states is discriminated at the time of the start, the normal output operation, the stop, or the like, and for example, even when the magnetic field current is the same in these operation states, the control gain is the value suitable for each of the operation states. This means that the proportional gain Ka of the regulator 22 expressed by the equation (2) that is different for each of the operation states is adopted.

From embodiment 6, the operation by the control gain that is made appropriate according to the operation state is enabled.

Embodiment 7

Embodiments 1 to 6 describe cases where the proportional gain in the proportional control among the control constants is changed. Note that the equivalent effect of embodiments 1 to 6 can be obtained by changing the integral gain Ki and the integration time constant Ti that are the control constants in the integral control (the integral gain Ki=1/the integration time constant Ti).

Embodiment 7 will describe the changing of the integral gain Ki and the integration time constant Ti that are the control constants in the integral control by taking the automatic voltage regulator AVR as a representative example.

Figure 14:
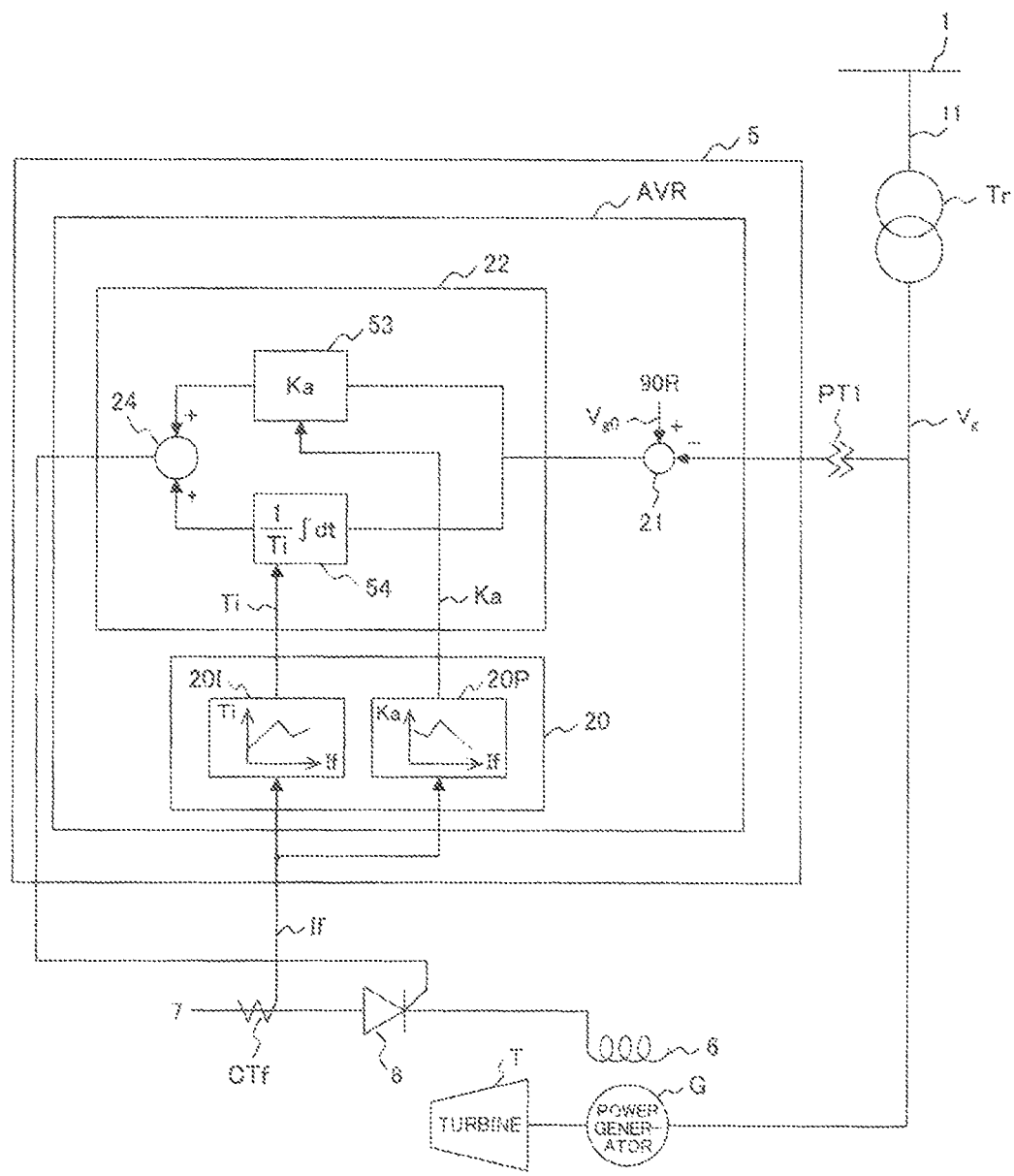
FIG. 14 is a diagram illustrating an example of the configuration of the magnetic field control device of the power generator, as an example of compensation in proportional integral control.

The AVR arithmetic operation section 22 of the automatic voltage regulator AVR illustrated in FIG. 7 performs proportional integral control, and the specific control circuit configuration is illustrated in FIG. 14. The AVR arithmetic operation section 22 in FIG. 14 includes a proportional computation unit 53 that proportionally computes the voltage deviation signal ΔV and an integral computation unit 54 that integrally computes the voltage deviation signal ΔV, and inputs a voltage deviation signal ΔV and outputs the sum of the computed results of the proportional computation unit 53 and the integral computation unit 54.

In FIG. 14, the deviation (the voltage deviation ΔV) between the generator terminal voltage Vg detected by the voltage transformer PT1 and the set voltage Vg0 is calculated by the subtractor 21, proportionally computed result and integrally computed result of the voltage deviation ΔV are obtained by the proportional computation unit 53 and the integral computation unit 54, respectively in the AVR arithmetic operation section 22, and the thyristor is controlled by a proportional integral signal obtained by summing the proportionally computed result and integrally computed result by the adder 24, thereby controlling the magnetic field current.

Note that the computation in the AVR arithmetic operation section 22 can be expressed by the equation (5):

$$\text{The output of the AVR arithmetic operation section } 22 = Ka \times \Delta V + (1/Ti) \int \Delta V dt \quad (5)$$

wherein the proportional gain is denoted by Ka and the integration time constant is denoted by Ti.

In this case, the compensation circuit 20 includes a compensation circuit 20P for the proportional gain Ka and a compensation circuit 20I for the integration time constant Ti, and reflects the respective compensation Ka and Ti to the proportional computation unit 53 and the integral computation unit 54, respectively. Note that since the integral gain Ki and the integration time constant Ti are in the relationship of the integral gain Ki=1/the integration time constant Ti, so that the changing of the integration time constant Ti is equivalent to the changing of the integral gain Ki. However, in FIG. 14, to perform the compensation by the integration time constant Ti, the characteristic of the compensation circuit 20I for the integration time constant Ti is in the relationship in which as the DC magnetic field current is larger, the integration time constant Ti becomes larger.

As described above, in short, the present invention changes the control constant in the control device by the DC magnetic field current, and when the regulator in this case performs the proportional control, the proportional gain Ka is changed, and when the regulator in this case performs the integral control, the integral gain Ki or 1/the integration time constant Ti should be changed. Also, when the regulator performs the proportional integral control, one of the proportional side and the integral side may be changed or both may be changed. This may be decided by reflecting the individual circumstance in the entire control system.

Note that from embodiments 1 to 7, configuring the magnetic field control device for the synchronous machine has been described, but this can also grasp the invention as the magnetic field control method for the synchronous machine. In this case, it can be said that a method according to the present invention is a magnetic field control method for a synchronous machine that controls the magnetic field of the synchronous machine connected to a power system, wherein the control constant of a magnetic field control system operating electric current flowing through a magnetic field coil of the synchronous machine is variably regulated according to a magnitude of magnetic field current or an equivalent of the magnetic field current.

REFERENCE SIGNS LIST

1: power system
2A: wind power generation plant
2B: photovoltaic power generation plant
2C1 to 2Cn: conventional-type power generation plant
3: central load dispatching office
4: control device
5: magnetic field control device
6: magnetic field coil
7: AC power supply
8: thyristor
10: load of the entire power system
11, . . . 1n: power transmission line
20, 20Q, 20PF: compensation circuit
21: subtractor
22: AVR arithmetic operation section
24: adder
25: reactive power detection unit
26: reactive power setting unit
31: voltage detection reference voltage setting unit
32: reactive power distribution unit
33: phase compensation circuit unit
34: output limiter
42: active power detector
43: power factor computation device
44: arithmetic operation device
50: control function
51: rotation speed detector
52: power detector
90R, 90H: voltage-target setting device
111: frequency detection unit
112: power calculation unit
113: arithmetic operation device
f: power system frequency
f0: constant frequency
τ: time constant
D1, D2, . . . Dn: output instruction value
T: turbine
G: power generator
B: steam generator
CV: steam regulation valve
CT1, CT2, CTf: current transformer
Tr: transformer
If: DC magnetic field current
Ig: power generator terminal current
Vg: generator terminal voltage
Vg0: set voltage
Vh: bus voltage
Vh0: reference voltage
Q: reactive power
AVR: automatic voltage regulator
PSVR: power system voltage regulator
PSS: power system stabilizer
PT1, PT2: voltage transformer
AQR: automatic reactive power regulator
APFR: automatic power factor regulator

What is claimed is:

1. A magnetic field control device for a synchronous machine that controls a magnetic field of the synchronous machine connected to a power system, the magnetic field control device comprising:

a magnetic field control system operating electric current flowing through a magnetic field coil of the synchronous machine;
a regulator of the magnetic field control system; and
a compensation circuit receiving as an input, a magnetic field current or an equivalent of the magnetic field current, and variably regulating a control constant of the regulator according to a magnitude of the received magnetic field current or the received equivalent of the magnetic field current.

2. The magnetic field control device according to claim 1,
wherein the magnetic field control system is an automatic voltage regulator operating the electric current flowing through the magnetic field coil of the synchronous machine according to terminal voltage deviation of the synchronous machine, and
wherein the compensation circuit variably regulates the control constant of the regulator of the magnetic field control system of the automatic voltage regulator according to the magnitude of the received magnetic field current.

3. The magnetic field control device according to claim 2,
wherein the magnetic field control system is a power system voltage regulator regulating the terminal voltage deviation of the automatic voltage regulator according to bus voltage deviation of the synchronous machine, and
wherein the compensation circuit variably regulates the control constant of the regulator of the magnetic field control system from the power system voltage regulator to the automatic voltage regulator according to the magnitude of the received magnetic field current.

4. The magnetic field control device according to claim 2,
wherein the magnetic field control system is an automatic reactive power regulator regulating the terminal voltage deviation of the automatic voltage regulator according to reactive power deviation of the synchronous machine, and
wherein the compensation circuit variably regulates the control constant of the regulator of the magnetic field control system from the automatic reactive power regulator to the automatic voltage regulator according to a magnitude of reactive power that is the received equivalent of the magnitude field current.

5. The magnetic field control device according to claim 2,
wherein the magnetic field control system is an automatic power factor regulator regulating the terminal voltage deviation of the automatic voltage regulator to make a power factor of the synchronous machine constant, and
wherein the compensation circuit variably regulates the control constant of the regulator of the magnetic field control system from the automatic power factor regulator to the automatic voltage regulator according to the power factor that is the received equivalent of the magnetic field current.

6. The magnetic field control device according to claim 2,
wherein the magnetic field control system is a power system stabilizer regulating the terminal voltage deviation of the automatic voltage regulator according to a power stabilization signal calculated from a power and a power system frequency of the synchronous machine, and
wherein the compensation circuit variably regulates the control constant of the regulator of the magnetic field control system from the power system stabilizer to the automatic voltage regulator according to the received magnetic field current.

7. The magnetic field control device according to claim 1, wherein the compensation circuit reduces the control constant of the regulator of the magnetic field control system when the magnitude of the received magnetic field current or the received equivalent of the magnetic field current is large.

8. The magnetic field control device according to claim 1, wherein the compensation circuit variably regulates the control constant according to an operation state of the power generator system.

9. The magnetic field control device according to claim 1, wherein the control constant includes at least one of a proportional gain in proportional control and an integral gain or an integration time constant in integral control.

10. A magnetic field control method for a synchronous machine that controls a magnetic field of the synchronous machine connected to a power system, the magnetic field control method comprising:

receiving as an input, a magnetic field current or an equivalent of the magnetic field, and variably regulating a control constant of a magnetic field control system according to a magnitude of the received magnetic field current or the received equivalent of the magnetic field current, the magnetic field control system operating electric current flowing through a magnetic field coil of the synchronous machine.

* * * * *